United States Patent [19]

Mountz

[11] 4,186,537
[45] Feb. 5, 1980

[54] TRANSVERSE INTERLOCK FLOORS FOR TRUCKS AND THE LIKE

[75] Inventor: Elton E. Mountz, Morgantown, Pa.

[73] Assignee: Morgan Trailer Mfg., Morgantown, Pa.

[21] Appl. No.: 936,034

[22] Filed: Aug. 23, 1978

[51] Int. Cl.$^2$ ............................ E04B 5/10; E04B 5/14; B62D 27/06
[52] U.S. Cl. ........................... 52/483; 52/488; 52/588
[58] Field of Search .................. 296/28 M; 105/422; 52/364, 377, 763, 588, 483, 488, 489, 264

[56] References Cited

U.S. PATENT DOCUMENTS

| | | | |
|---|---|---|---|
| 1,913,342 | 6/1933 | Schaffert | 52/483 X |
| 2,478,993 | 8/1949 | Wing | 52/588 X |
| 2,667,243 | 1/1954 | Penske | 52/377 |
| 2,681,715 | 6/1954 | Hansen | 52/483 X |
| 2,753,018 | 7/1956 | Curell | 52/588 X |
| 2,900,055 | 8/1959 | Shaver | 52/377 |
| 2,907,417 | 10/1959 | Doerr | 52/377 |
| 2,955,687 | 10/1960 | Seim | 52/377 |
| 3,026,821 | 3/1962 | Oakley | 52/588 X |
| 3,080,021 | 3/1963 | Miur | 52/460 |
| 3,152,669 | 10/1964 | Johnston | 52/364 |
| 3,187,853 | 6/1965 | Glaser et al. | 52/377 |
| 3,269,072 | 8/1966 | Black | 52/588 X |
| 3,909,059 | 9/1975 | Benninger et al. | 52/464 |

FOREIGN PATENT DOCUMENTS

| | | | |
|---|---|---|---|
| 1250010 | 11/1961 | France | 52/588 |
| 649309 | 1/1951 | United Kingdom | 296/28 M |
| 835260 | 5/1960 | United Kingdom | 296/28 M |
| 294607 | 2/1954 | Switzerland | 52/483 |

Primary Examiner—Alfred C. Perham
Attorney, Agent, or Firm—Zachary T. Wobensmith, 2nd; Zachary T. Wobensmith, III

[57] ABSTRACT

A transverse interlock floor for the bodies of trucks, vans, trailers and other vehicles is disclosed in which extruded transverse floor panels are employed extending from side to side in the body with edge interlocks between adjoining panels, and with stiffening braces on the undersides of the panels, the panels being secured to and supported from below on transverse I-beams of the body and with intermediate stiffening braces if desired, the transverse I-beams being supported on the longitudinal I-beams or frame members of the body which latter are secured to the longitudinal frame channels of the truck chassis.

12 Claims, 3 Drawing Figures

TRANSVERSE INTERLOCK FLOORS FOR TRUCKS AND THE LIKE

BACKGROUND OF THE INVENTION

1. Field of the Invention

This invention relates to metal floors for the bodies of trucks, vans, trailers and the like.

2. Brief Description of the Prior Art

It has heretofore been common practice to employ wooden floors in the bodies of commercial motor vehicles such as trucks, vans, trailers and the like. Such floors, particularly in trailers, usually had the wooden planks longitudinally extending and supported on cross beams carried on longitudinally extending frames. The many variations in length to meet the demands of various purchasers required maintaining an inventory of different lengths of planks at great expense. Such planks have customarily been of lengths of 10, 12, 14, 16, 18, 20, 22, 24 and 26 feet. Further, suitable planks have become more and more difficult to obtain in North America and importation from Asia at great expense has become necessary.

It has been proposed to provide, in trucks and freight cars, metal planks longitudinally disposed, as shown in the U.S. Pats. to Wing, No. 2,478,993; Fenske, No. 2,667,243; Curell, No. 2,753,018; Seim, No. 2,955,687; Muir, No. 3,080,021; and Benninger et al., No. 3,909,059 but such longitudinally disposed planks have various shortcomings, including the tendency to bend due to localized loads and transmission of the bending effect to other lengthwise locations with increased stress on the fastenings at such locations.

The use of transverse metal planks for floors of trucks and railway cars is shown in the U.S. Pats. to Hansen, No. 2,681,715; Shaver, No. 2,900,055; Doerr, No. 2,907,417; Black, No. 3,269,072; Oakley, No. 3,026,821; and Glaser et al., No. 3,187,853.

The mode of securing the planks together or to the supports as shown by Shaver, Doerr, Black, Oakley and Glasser et al. is not entirely reliable and greatly increases the cost of assembling the components.

In Hansen, U.S. Pat. No. 2,681,715 steel boards are employed with the planks welded to each other and the assembly held to longitudinal supports by clamps. The disposition of the longitudinal supports, while suitable for freight cars and other metal flooring would not be suitable for truck bodies having a conventional spaced pair of longitudinal beams forming part of the truck chassis. The clamps in Hansen are limited in length by the width of the boards. In the present invention aluminum boards are used which do not require welding, which boards have stiffeners and which are supported by rails parallel to the boards and clamped to such rails, the assembly being supported on and secured to longitudinal I-beams forming part of the truck body which are in turn secured to the longitudinal channels of the chassis.

SUMMARY OF THE INVENTION

In accordance with the invention a transverse interlock floor for the bodies of trucks, vans, trailers and other vehicles is provided in which extruded transverse floor planks or panels are provided, preferably of extruded aluminum, extending from side to side of the vehicle, with stiffening bracing on the undersides of the panels, with edge interlocks between adjoining panels, the panels being secured by clamps to and supported from below on transverse I-beams with stiffening braces, if desired, the transverse I-beams being supported on the longitudinal I-beams of the body which are in turn supported on and secured to the longitudinal frame channels of the truck chassis.

It is the principal object of the invention to provide transverse interlock flooring for the bodies of vehicles such as trucks, vans, trailers and other vehicles which are strong and sturdy, and which will have a long useful life.

It is a further object of the invention to provide a transverse interlock flooring suitable for use with a variety of commercial vehicles, which does not require extensive changes in the design or assembly of commercial vehicle bodies now made, and which because of ease of assembly will permit of savings and reduction of cost.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

Figure 1:
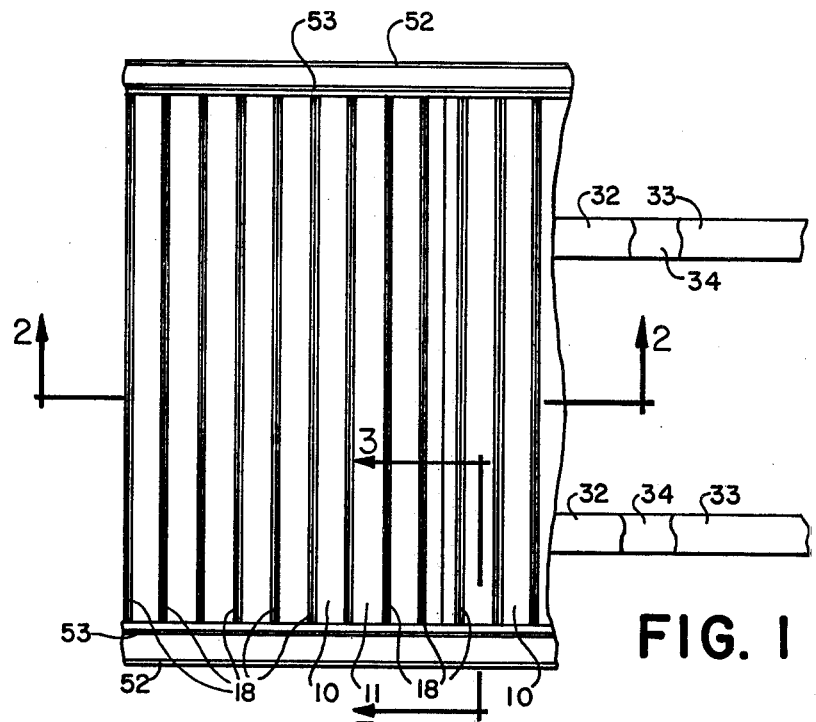
FIG. 1 is a fragmentary top plan view of a portion of transverse interlock flooring in accordance with the present invention.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings, in which a preferred embodiment of the invention is illustrated, a plurality of floor panels or planks 10 are provided of a length in accordance with the interior width of the vehicle and of a width as desired, which in a specific embodiment can be of the order of six inches.

Each plank 10 has a top plate portion 11 and extending along one side edge for the length of the plank 10, a downwardly extending side wall 12 with a groove or recess 13 and a horizontally inwardly extending flange 14 with a bottom face 14a.

Each plank 10 has along its other side edge a downwardly extending side wall 15 with a tongue 16, complemental to and engaged in the groove or recess 13, and a horizontally inwardly extending flange 17 with a bottom face 17a.

The top face of the plate portion 11 can have any desired configuration thereon to increase its frictional resistance to movement of articles placed thereon, a plurality of spaced ribs 18 being illustrated.

On the underside of the plate portion 11, and preferably extending the length thereof, a plurality of inverted T-shaped stiffening ribs 19 with outwardly extending flanges 20 are provided with lower faces 20a which are preferably in the same plane as the faces 14a and 17a.

In supporting relation to the planks 11 beneath the flanges 14 and 17, transverse I-beams 25 are provided which form part of the body of the vehicle. In a specific embodiment, the I-beams 25 can have a height of four inches.

Interposed between the upper faces of the I-beams 25 and the faces 14a and 17a of the planks 10, cushioning strips 26 are provided, of wood or other desired suitable material to reduce transmission of noise and other vibrations in either direction.

In order to retain the planks 10 in position on the I-beams 25, clips 28 are preferably employed which may extend substantially the length of the planks 10 and have an upper elongated plate portion 29 for engagement with the upper face 14b of the flange 14 and the upper face 20b of a contiguous rib 19. Each clip 28 has extending downwardly from the plate portion 29 an elongated hook 30 for engagement with the lower face of one of the flanges of the I-beam 25. The clip 28 can be put in place by inserting it with the plate portion 29 inclined and its right edge slid along flange 14 and then swung downwardly to engage the hook beneath the flange of the I-beam 25 and the plate into engagement with the face 20b.

The I-beams 25 are supported on and secured, such as by welding, to longitudinally extending I-beams 32 which form part of the body of the vehicle.

Figure 3:
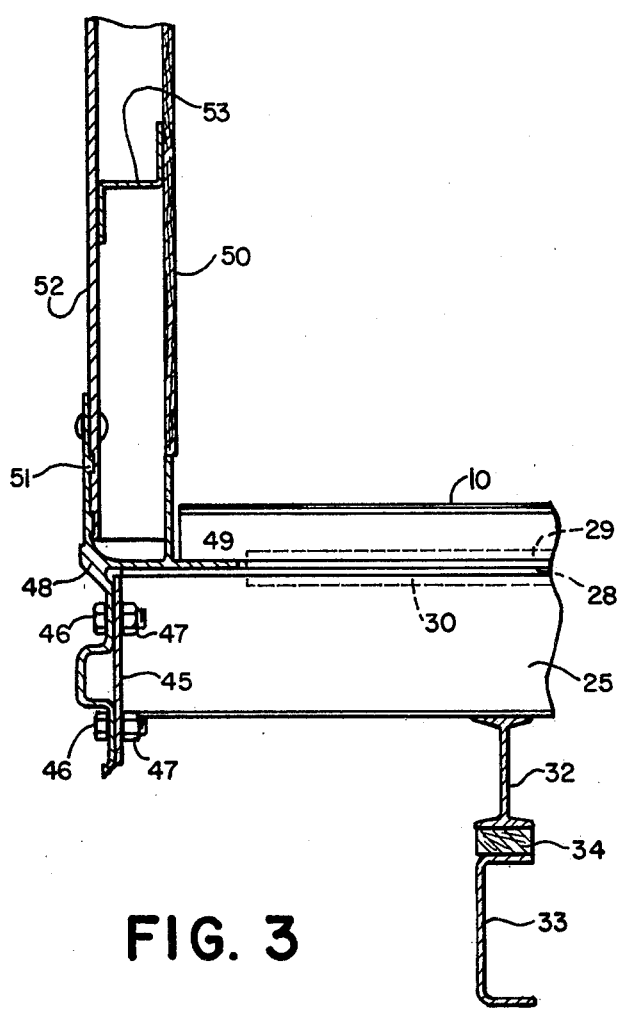
FIG. 3 is a fragmentary vertical sectional view, enlarged, taken approximately on the line 3—3 of FIG. 1.

In FIG. 3, the relation of the floor planks 10, and the I-beams 25 to other parts of the vehicle body is illustrated. The I-beams 25 extend outwardly beyond the ends of the floor planks 10 and have vertical mounting plates 45 secured thereto for the attachment by bolts 46 and nuts 47 of body frame strips 48.

The frame strips 48 have inner upright ribs 49 to which plywood panels 50 are secured and outer upright ribs 51 for the attachment of sheet aluminum 52 with Z-shaped frame bars and spacers 53 therebetween and which are spaced in accordance with the spacing of the channels 33 which are part of the chassis on which the body is to be used. The I-beams 32 are secured to the channels 33 in any desired manner such as by inverted U-bolts (not shown) with interposed cushioning strips 34.

Figure 2:
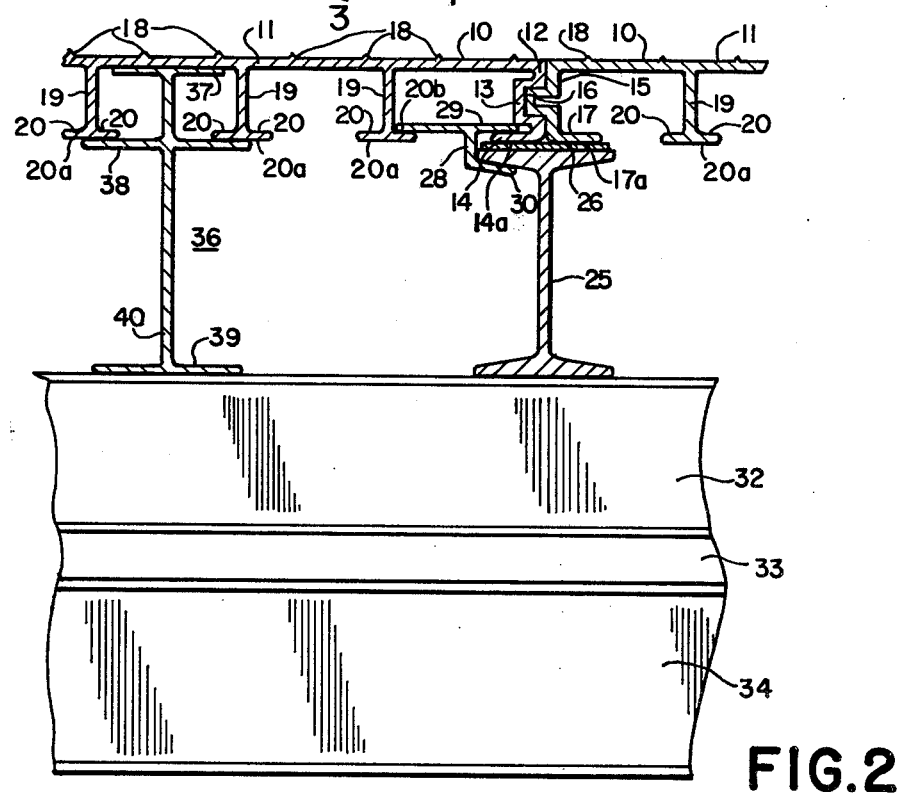
FIG. 2 is a fragmentary vertical sectional view, enlarged, taken approximately on the line 2—2 of FIG. 1.

If desired, and dependent upon the width of the planks 10 and the expected loading thereof, intermediate supports 36, shown in FIG. 2, may be employed between the side walls 12 and 15 of the planks 10.

The supports 36, which extend the length of the planks 10, preferably include a top flange 37 for supporting engagement with the under side of the top plate 11, an intermediate flange 38 for supporting engagement with faces 20a of contiguous ribs 19 and an upright 40 connecting the flanges 37, 38 and 39.

The supports 36, like the I-beams 25, preferably have their flanges 39 supported by and secured to the I-beams 32.

I claim:

1. A floor construction for the body of a vehicle comprising
(A) a plurality of floor planks transversely disposed in edge to edge relation,
    each of said planks comprising a top plate with downwardly extending side walls,
    the side walls of each plank having interengaging portions for preventing horizontal movement of contiguous planks,
    said top plate having between said side walls reinforcing ribs extending downwardly therefrom,
    said side walls and said ribs having horizontal flanges;
(B) transverse supporting beams in supporting relation to said floor planks beneath the horizontal side wall flanges of contiguous planks; and
(C) members for holding said planks in engagement with said beams having portions in engagement with a flange of a side edge, a flange of a rib and a flange of a transverse supporting beam.

2. A floor construction as defined in claim 1 in which said ribs are of inverted T-shape.

3. A floor construction as defined in claim 1 in which said planks are aluminum extrusions.

4. A floor construction as defined in claim 1 in which cushioning strips are interposed between said transverse supporting beams and the horizontal side wall flanges supported thereby.

5. A floor construction as defined in claim 1 in which said members have elongated plate portions for engagement with upper faces of said side edge flanges and of said ribs.

6. A floor construction as defined in claim 5 in which said member has an elongated hook extending downwardly therefrom and in engagement with a lower face of the supporting beam.

7. A floor construction as defined in claim 1 in which said transverse supporting beams are I-beams.

8. A floor construction as defined in claim 1 in which said transverse supporting beams are secured to spaced longitudinal body frame beams.

9. A floor construction as defined in claim 8 in which said body frame beams are spaced for attachment to chassis frame beams.

10. A floor construction as defined in claim 1 in which additional supports are provided for said floor planks intermediate said side walls.

11. A floor construction as defined in claim 1 in which spaced longitudinal body frame beams are provided, and additional supports are provided for supporting engagement with said floor planks intermediate the side walls and with said longitudinal frame beams.

12. A floor construction as defined in claim 1 in which additional supports are provided for supporting engagement with said top plates of said floor planks and with said ribs.

* * * * *

UNITED STATES PATENT OFFICE
CERTIFICATE OF CORRECTION

Patent No. 4,186,537    Dated February 5, 1980

Inventor(s)    Elton E. Mountz

It is certified that error appears in the above-identified patent and that said Letters Patent are hereby corrected as shown below:

Assignee, should read - Morgan Trailer Mfg., Co. -

Signed and Sealed this

Fourteenth Day of October 1980

[SEAL]

Attest:

SIDNEY A. DIAMOND

Attesting Officer    Commissioner of Patents and Trademarks